United States Patent
Tamaizumi et al.

(10) Patent No.: US 11,318,987 B2
(45) Date of Patent: May 3, 2022

(54) STEERING CONTROLLER AND STEERING CONTROL METHOD

(71) Applicants: JTEKT CORPORATION, Osaka (JP); JTEKT EUROPE S.A.S., Irigny (FR)

(72) Inventors: Terutaka Tamaizumi, Okazaki (JP); Tahar Slama, Ecully (FR); Pascal Moulaire, Salvagny (FR); Pierre Larminy, Oullins (FR)

(73) Assignees: JTEKT CORPORATION, Osaka (JP); JTEKT EUROPE S.A.S., Irigny (FR)

( * ) Notice: Subject to any disclaimer, the term of this patent is extended or adjusted under 35 U.S.C. 154(b) by 346 days.

(21) Appl. No.: 16/735,762

(22) Filed: Jan. 7, 2020

(65) Prior Publication Data
US 2020/0223475 A1 Jul. 16, 2020

(30) Foreign Application Priority Data
Jan. 10, 2019 (JP) .............................. JP2019-002355

(51) Int. Cl.
*B62D 5/04* (2006.01)
*B62D 15/02* (2006.01)

(52) U.S. Cl.
CPC ......... *B62D 5/0463* (2013.01); *B62D 5/0475* (2013.01); *B62D 15/024* (2013.01)

(58) Field of Classification Search
CPC combination set(s) only.
See application file for complete search history.

(56) References Cited

U.S. PATENT DOCUMENTS

| 6,212,453 B1 * | 4/2001 | Kawagoe | B62D 5/0463 701/28 |
| 8,775,025 B2 * | 7/2014 | Yamaguchi | B62D 5/008 701/44 |
| 9,975,573 B2 * | 5/2018 | She | B62D 5/0484 |

(Continued)

FOREIGN PATENT DOCUMENTS

| DE | 19943410 A1 | 5/2000 |
| EP | 3 213 979 A1 | 9/2017 |

(Continued)

OTHER PUBLICATIONS

Jan. 3, 2022 Office Action issued in European Patent Application No. 20305007.5.

(Continued)

*Primary Examiner* — Aniss Chad
*Assistant Examiner* — Christopher George Fees
(74) *Attorney, Agent, or Firm* — Oliff PLC

(57) ABSTRACT

A steering controller includes processing circuitry configured to execute a torque control process that calculates a steering-side operation amount, an angle feedback control process that calculates an angle-side operation amount, and an operation process that operates a drive circuit of an electric motor to adjust torque of the electric motor to a torque command value. The processing circuitry is further configured to execute a switch process that switches, when determining that a controllability of the electric motor is less than or equal to a predetermined efficiency, the torque command value from a value based on the angle-side operation amount to a value based on the steering-side operation amount instead of the angle-side operation amount.

8 Claims, 3 Drawing Sheets

(56) References Cited

U.S. PATENT DOCUMENTS

2017/0253265 A1* 9/2017 Nishimura ............. B62D 6/008
2019/0270482 A1* 9/2019 Nakakuki ............ B62D 5/0469

FOREIGN PATENT DOCUMENTS

JP      2004-203089 A      7/2004
JP      2006-151360 A      6/2006

OTHER PUBLICATIONS

U.S. Appl. No. 16/735,744, filed Jan. 7, 2020 in the name of Tamaizumi et al.
Jun. 2, 2020 Extended Search Report issued in European Patent Application No. 20305007.5.

* cited by examiner

STEERING CONTROLLER AND STEERING CONTROL METHOD

BACKGROUND

1. Field

The present disclosure relates to a steering controller and a steering control method for operating a steering actuator that incorporates an electric motor and steers steerable wheels.

2. Description of Related Art

Japanese Laid-Open Patent Publication No. 2006-151360 describes an example of a steering controller that sets the torque of a motor incorporated in a steering actuator that steers steerable wheels. The steering controller executes feedback control that adjusts a steering angle to a target steering angle. The torque of the motor is set based on an operation amount used for the feedback control.

In the above-described controller, for example, when an anomaly occurs in a sensor that detects a steering angle, which is a control amount adjusted through the feedback control, or when an anomaly occurs in the feedback control, such an anomaly cannot be addressed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A steering controller for operating a steering actuator that incorporates an electric motor and steers a steerable wheel is provided. The steering controller includes processing circuitry configured to execute a torque control process that calculates a steering-side operation amount based on a steering torque input by a driver, the steering-side operation amount being used to adjust the steering torque and being convertible into torque required for the electric motor, an angle command value calculation process that calculates an angle command value based on the steering-side operation amount, the angle command value being a command value of a convertible angle that is convertible into a steerable angle of the steerable wheel, an angle feedback control process that calculates an angle-side operation amount, the angle-side operation amount being used for feedback control that adjusts the convertible angle to the angle command value and being convertible into the torque required for the electric motor, a process that obtains a torque command value based on at least one of the steering-side operation amount or the angle-side operation amount, an operation process that operates a drive circuit of the electric motor to adjust the torque of the electric motor to the torque command value, a determination process that determines whether a controllability of the electric motor based on the angle feedback process is less than or equal to a predetermined efficiency, and a switch process that switches, when determining that the controllability is less than or equal to the predetermined efficiency, the torque command value from a value based on the angle-side operation amount to a value based on the steering-side operation amount instead of the angle-side operation amount.

In the above-described configuration, the angle command value used as an input of the angle feedback process is calculated based on the steering-side operation amount calculated through the torque control process. That is, the angle feedback control is performed subsequent to the torque control process. Thus, if the torque command value is calculated only from the angle-side operation amount calculated through the angle feedback process and an anomaly occurs in a process subsequent to the torque control process, the electric motor may not be able to be controlled properly. In the above-described configuration, while the torque command value is set to a value based on the angle-side operation amount before the controllability of the electric motor based on the angle feedback process becomes less than or equal to the predetermined efficiency, the torque command value is switched to a value based on the steering-side operation amount instead of the angle-side operation amount when the controllability is less than or equal to the predetermined efficiency. This restricts situations in which the electric motor is not able to be controlled properly even if an anomaly occurs in the process subsequent to the torque control process.

Example 2: In the steering controller according to Example 1, the steering actuator includes a rack shaft configured to move in an axial direction to steer the steerable wheel and a rack housing configured to limit a potential value of the steerable angle. The determination process includes determining that the controllability is less than or equal to the predetermined efficiency when determining that further movement of the rack shaft in the axial direction is restricted by the rack housing based on the steerable angle.

In a state in which further movement of the rack shaft in the axial direction is restricted by the rack housing, the convertible angle cannot be adjusted to the angle command value. In the above-described configuration, in the state in which further movement of the rack shaft in the axial direction is restricted by the rack housing, it is determined that the controllability of the electric motor is less than or equal to the predetermined efficiency.

Example 3: In the steering controller according to Example 1 or 2, the determination process includes determining that the controllability is less than or equal to the predetermined efficiency when an absolute value of a difference between the convertible angle and the angle command value is larger than a predetermined value.

In the above-described configuration, when the absolute value of the difference between the convertible angle and the angle command value is excessively large, the controllability with the angle feedback process may decrease. Thus, when the absolute value of the difference between the convertible angle and the angle command value is excessively large, it is determined that the controllability of the electric motor is less than or equal to the predetermined efficiency.

Example 4: In the steering controller according to any one of Examples 1 to 3, the switch process includes a gradual decreasing process that gradually decreases, to zero, an absolute value of the angle-side operation amount used as an input of the operation process as the torque command value changes from the value based on the angle-side operation amount to the value based on the steering-side operation amount instead of the angle-side operation amount.

In the above-described configuration, the absolute value of the angle-side operation amount used as an input of the operation process is gradually decreased to zero. This limits an abrupt change in the torque of the electric motor as compared to when the angle-side operation amount is set to zero in a stepwise manner.

Example 5: In the steering controller according to any one of Examples 1 to 4, the switch process includes a subtraction process that subtracts, from an amount based on the steering-side operation amount, an amount corresponding to a deficient amount of the angle-side operation amount used as an input of the operation process for the angle-side operation amount calculated through the angle feedback control process as the torque command value changes from the value based on the angle-side operation amount to the value based on the steering-side operation amount instead of the angle-side operation amount.

The angle-side operation amount calculated through the angle feedback process is a suitable operation amount for adjusting the convertible angle to the angle command value. Thus, when the angle-side operation amount used as an input of the operation process is deficient of the angle-side operation amount calculated through the angle feedback process, the convertible angle may greatly deviate from the angle command value. Large deviation of the convertible angle from the angle command value increases the absolute value of the angle-side operation amount calculated through the angle feedback process. Thus, by cancelling a situation in which the controllability of the electric motor is determined as being less than or equal to the predetermined efficiency, the torque of the electric motor may become excessively large when the torque command value is switched to a value based on the angle-side operation amount. In the above-described configuration, the amount obtained by subtracting the amount corresponding to the above-described deficient amount from the amount used as an input of the angle command value calculation process is used in the angle command value calculation process. This causes the angle command value to approximate to the convertible angle and consequently prevents the absolute value of the angle-side operation amount from becoming excessively large.

Example 6: In the steering controller according to any one of Examples 1 to 5, the torque control process includes a torque feedback process that calculates the steering-side operation amount used for feedback control that adjusts the steering torque input by the driver to the target torque.

In the above-described configuration, the feedback control that adjusts the steering torque to the target torque is executed. Thus, as compared to when the feedback control is not executed, the controllability of the target torque is improved. This also improves the steering feel of the driver.

Example 7: In the steering controller according to Example 6, the processing circuitry is configured to execute a target torque calculation process that calculates the target torque, and the target torque calculation process includes obtaining a conversion amount by converting each of the steering-side operation amount and the steering torque into force acting on a same object and calculating the target torque based on a sum of the conversion amounts.

The steering-side operation amount can be converted into the torque required for the electric motor. Thus, the steering-side operation amount and the steering torque determine the force applied from the vehicle to steer the steerable wheel. This force determines the side force. The target torque required to improve the steering feel by the driver tends to be determined by the side force. Thus, in the above-described configuration, determining the target torque based on the sum facilitates the designing of the target torque calculation process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A steering controller 40 according to an embodiment will now be described with reference to the drawings.

Figure 1:
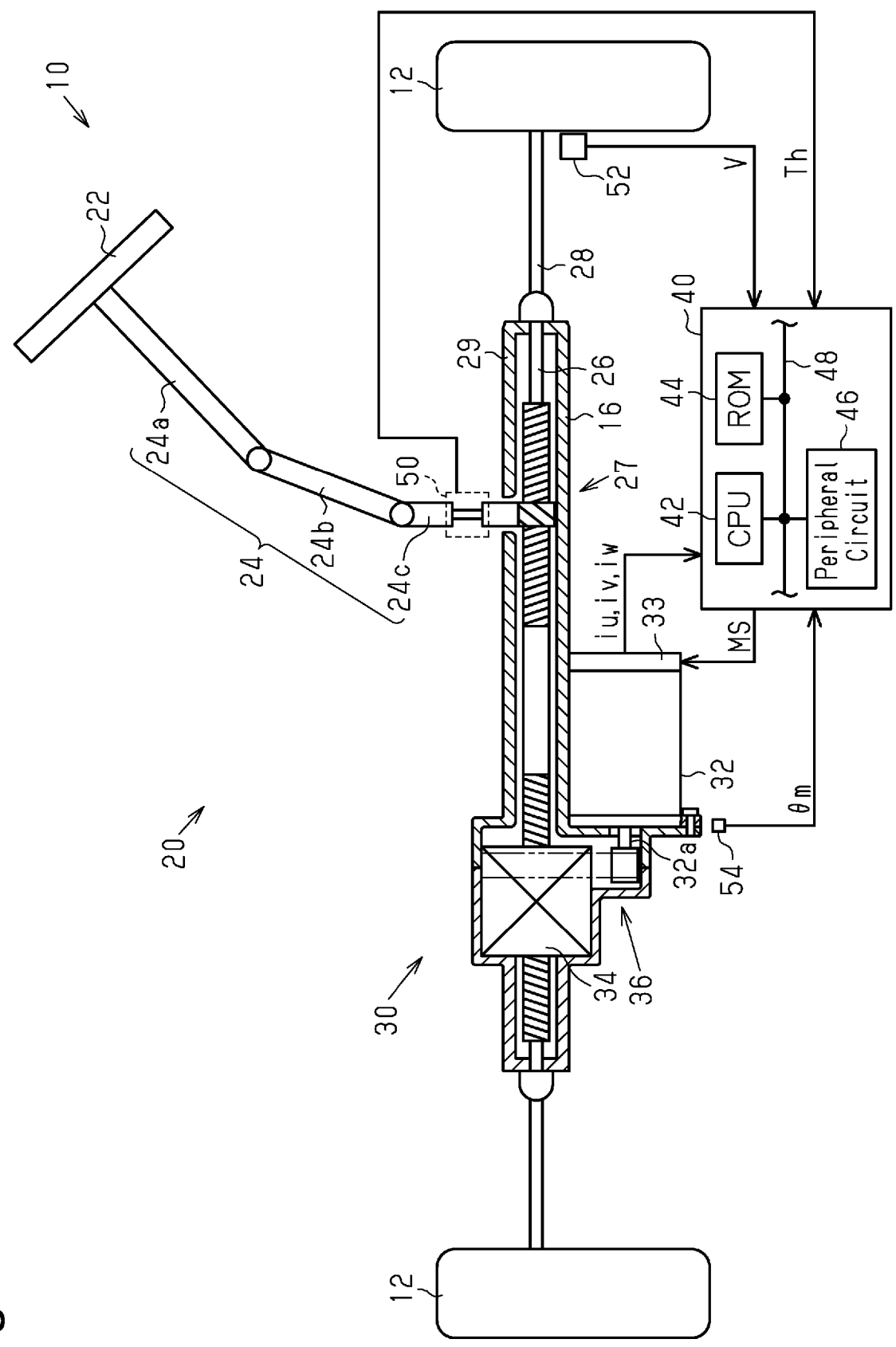
FIG. 1 is a diagram showing an electric power steering according to an embodiment.

As shown in FIG. 1, an electric power steering 10 includes a steering mechanism 20, which steers steerable wheels 12 based on the operation of a steering wheel 22 performed by a driver, and a steering actuator 30, which electrically steers the steerable wheels 12.

The steering mechanism 20 includes the steering wheel 22, a steering shaft 24, which is fixed to the steering wheel 22, and a rack-and-pinion mechanism 27. The steering shaft 24 includes a column shaft 24a, which is coupled to the steering wheel 22, an intermediate shaft 24b, which is coupled to the lower end of the column shaft 24a, and a pinion shaft 24c, which is coupled to the lower end of the intermediate shaft 24b. The lower end of the pinion shaft 24c is coupled to a rack shaft 26 by the rack-and-pinion mechanism 27. The rack-and-pinion mechanism 27 includes the pinion shaft 24c and the rack shaft 26. The opposite ends of the rack shaft 26 are respectively coupled to the left and right steerable wheels 12 by a tie rod 28. Thus, the rack-and-pinion mechanism 27 converts rotation of the steering wheel 22 (i.e., rotation of the steering shaft 24) into reciprocation of the rack shaft 26 in the axial direction. The axial direction of the rack shaft 26 corresponds to the sideward direction in FIG. 1. The reciprocation is transmitted to the steerable wheels 12 from the tie rod 28, which is coupled to the opposite ends of the rack shaft 26, thereby changing the steerable angles of the steerable wheels 12. Movement of the rack shaft 26 in the axial direction is limited by the contact of the axial ends of the rack shaft 26 on a rack housing 29. That is, the upper limit value of the movement amount of the rack shaft 26 in the axial direction is determined by the rack housing 29. In other words, the rack housing 29 is configured to limit the upper limit value of the movement amount of the rack shaft 26 in the axial direction, that is, a potential value of the steerable angle of each steerable wheel 12.

The steering actuator 30 shares the rack shaft 26 with the steering mechanism 20. Further, the steering actuator 30 includes an electric motor 32, an inverter 33, a ball screw mechanism 34, and a belt reduction drive 36. The electric motor 32 is the generator of power that steers the steerable wheels 12. In the present embodiment, a three-phase surface permanent magnet synchronous motor (SPMSM) is exemplified as the electric motor 32. The ball screw mechanism 34 is arranged around the rack shaft 26 and coupled to the rack shaft 26. The belt reduction drive 36 transmits rotation force of an output shaft 32a of the electric motor 32 to the ball screw mechanism 34. The ball screw mechanism 34 and the belt reduction drive 36 convert the rotation force of the output shaft 32a of the electric motor 32 into force that reciprocates the rack shaft 26 in the axial direction. The axial force given to the rack shaft 26 steers the steerable wheels 12.

The steering controller 40 controls the steerable wheels 12. The steering controller 40 operates the steering actuator 30 in order to control a steerable angle, which is the control amount of each steerable wheel 12. When controlling the control amount, the steering controller 40 refers to the state quantities detected by various sensors. The state quantities include a steering torque Th, which is detected by a torque sensor 50, and a vehicle speed V, which is detected by a vehicle speed sensor 52. The steering torque Th is input by the driver via the steering wheel 22. The state quantities also include a rotation angle $\theta m$ of the output shaft 32a, which is detected by a rotation angle sensor 54, and include current iu, current iv, and current iw, which flow through the electric motor 32. The current iu, the current iv, and the current iw can be detected based on voltage drop caused by the shunt resistor of each leg of the inverter 33.

The steering controller 40 includes a CPU 42, a ROM 44, and a peripheral circuit 46. The CPU 42, the ROM 44 and the peripheral circuit 46 are connected to one another by a communication line 48. The peripheral circuit 46 includes various circuits such as a circuit that generates a clock signal specifying an internal operation, a power supply circuit, and a reset circuit.

Figure 2:
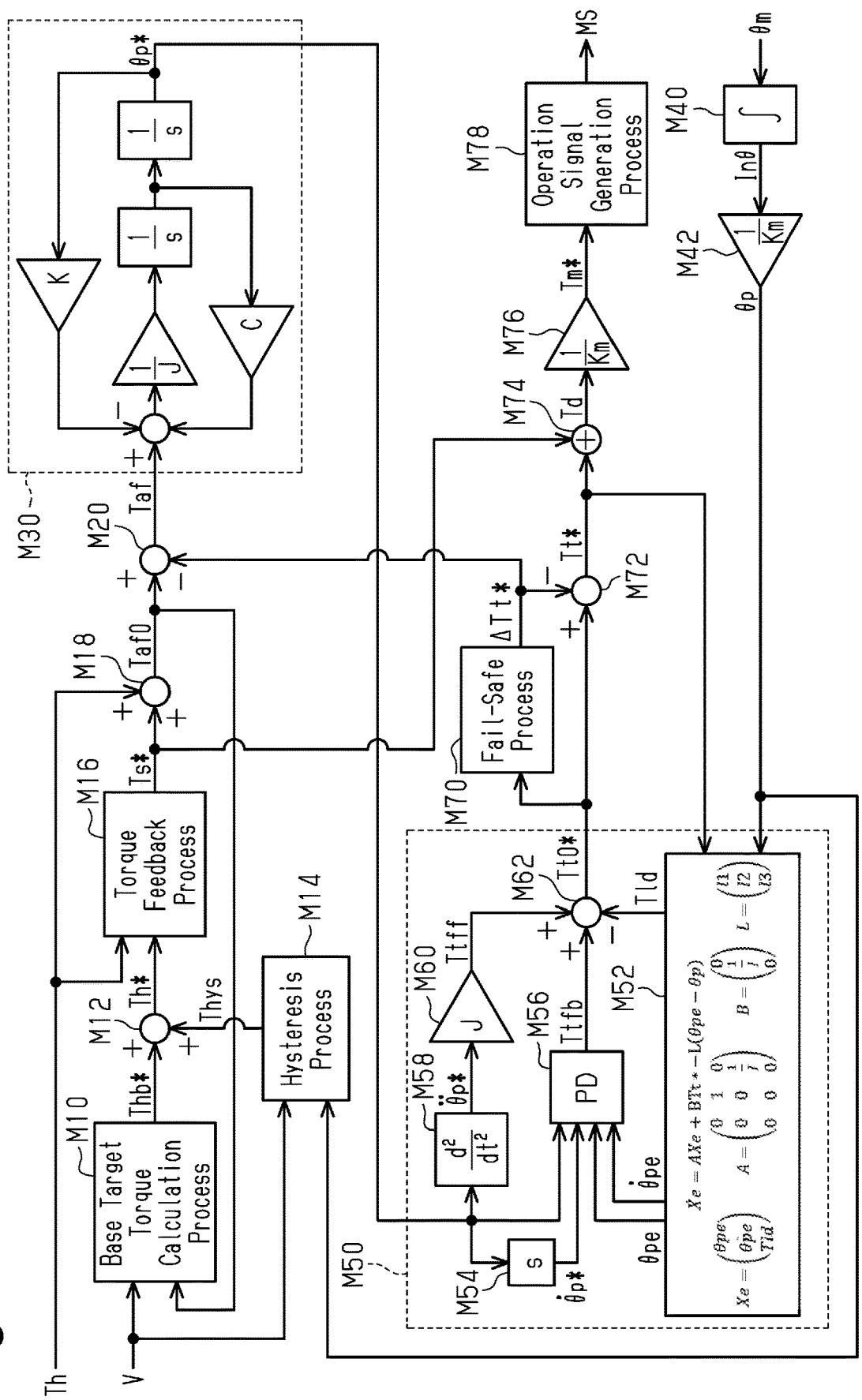
FIG. 2 is a block diagram illustrating processes executed by the steering controller of the embodiment.

FIG. 2 shows part of the processes executed by the steering controller 40. The processes of FIG. 2 are implemented by the CPU 42 executing programs stored in the ROM 44.

A base target torque calculation process M10 is a process for calculating a base target torque Thb* based on an axial force Taf0, which will be described later. The base target torque Thb* is the base value of a target torque Th*, which should be input by the driver to the steering shaft 24 via the steering wheel 22.

The axial force Taf0 is force applied to the rack shaft 26 in the axial direction. The axial force Taf0 has an amount corresponding to a side force acting on each steerable wheel 12. Thus, the side force can be obtained from the axial force Taf0. It is desired that the side force be used to determine the torque that should be input by the driver to the steering shaft 24 via the steering wheel 22. Accordingly, the base target torque calculation process M10 calculates the base target torque Thb* in accordance with the side force obtained from the axial force Taf0.

More specifically, even if the absolute value of the axial force Taf0 is the same, the base target torque calculation process M10 calculates the absolute value of the base target torque Thb* to be smaller when the vehicle speed V is low than when the vehicle speed V is high. This can be achieved by, for example, the CPU 42 obtaining the base target torque Thb* through map calculation in a state in which map data is stored in the ROM 44 in advance.

The map data refers to a data set of discrete values of input variables and values of output variables each corresponding to a value of the input variables. In the map data stored in the ROM 44, the axial force Taf0 or a lateral acceleration obtained from the axial force Taf0 and the vehicle speed V are set as input variables, and the base target torque Thb* is set as an output variable.

For example, when the value of an input variable matches one of the values of input variables on the map data, the map calculation uses the value of the corresponding output variable of the map data as the calculation result. When the value of the input variable does not match any of the values of the input variable on the map data, a value obtained by interpolation of multiple values of the output variable included in the map data is used as the calculation result.

A hysteresis process M14 is a process for calculating and outputting a hysteresis correction amount Thys, which is used to correct the base target torque Thb*, based on a pinion angle $\theta p$, which is the rotation angle of the pinion shaft 24c. The pinion angle $\theta p$ is a convertible angle that can be converted into the steerable angle of each steerable wheel 12. More specifically, the hysteresis process M14 includes a process for calculating the hysteresis correction amount Thys such that the absolute value of the target torque Th* is larger when steering the steering wheel 22 than when returning the steering wheel 22. The hysteresis process M14 distinguishes the steering period from the returning period of the steering wheel 22 based on, for example, changes in the pinion angle $\theta p$. The hysteresis process M14 includes a process for variably setting the hysteresis correction amount Thys in accordance with the vehicle speed V.

An addition process M12 is a process for calculating the target torque Th* by adding the hysteresis correction amount Thys to the base target torque Thb*.

A torque feedback process M16 is a process for calculating a steering-side operation amount Ts*, which is an operation amount for adjusting the steering torque Th to the target torque Th*. The steering-side operation amount Ts* includes an operation amount used for feedback control that adjusts the steering torque Th to the target torque Th*, i.e., a feedback operation amount. The feedback operation amount is used to increase the absolute value of a required torque for the electric motor 32 when, for example, the steering torque Th and the target torque Th* are both positive and the steering torque Th is larger than the target torque Th*. The steering-side operation amount Ts* is an amount corresponding to the required torque for the electric motor 32 and is also an amount converted into torque applied to the steering shaft 24 in the present embodiment.

An axial force calculation process M18 is a process for calculating the axial force Taf0 by adding the steering torque Th to the steering-side operation amount Ts*. The steering torque Th is torque applied to the steering shaft 24. Thus, in the present embodiment, the axial force Taf0 is a value obtained by converting, into the torque applied to the steering shaft 24, force applied in the axial direction of the rack shaft 26.

A subtraction process M20 is a process for calculating the axial force Taf by subtracting a decrease correction amount $\Delta Tt*$, which will be described later, from the axial force Taf0.

An angle command value calculation process M30 is a process for calculating a pinion angle command value $\theta p*$, which is a command value of the pinion angle $\theta p$, based on the axial force Taf, which is output from the subtraction process M20. More specifically, the angle command value calculation process M30 is a process for calculating the pinion angle command value θp* using a model expression represented by the following expression (c1).

$$Taf = K \cdot \theta\theta p^* + C \cdot \theta p^{*\prime} + J \cdot \theta p^{*\prime\prime} \quad (c1)$$

The model represented by the expression (c1) is obtained by modelling a value indicated by the pinion angle θp when the steering shaft 24 receives the torque having the same amount as the axial force Taf. In the model represented by the expression (c1), a viscosity coefficient C is obtained by modelling, for example, friction of the electric power steering 10. An inertia coefficient J is obtained by modelling the inertia of the electric power steering 10. A spring coefficient K is obtained by modelling the specification of the suspension or wheel alignment of a vehicle incorporating the electric power steering 10.

An integration process M40 is a process for calculating an integration value Inθ of the rotation angle θm of the electric motor 32. In the present embodiment, the steerable angle of the steerable wheel 12 is set to 0 when the vehicle travels straight, and the integration value Inθ is set to 0 when the steerable angle is 0. A conversion process M42 is a process for calculating the pinion angle θp by dividing the integration value Inθ by a deceleration ratio Km from the steering shaft 24 to the electric motor 32.

An angle feedback process M50 is a process for calculating an angle-side operation amount Tt0*, which is an operation amount used for the feedback control that adjusts the pinion angle θp to the pinion angle command value θp*. The angle-side operation amount Tt0* is an amount corresponding to the required torque for the electric motor 32 and is also an amount converted into torque applied to the steering shaft 24 in the present embodiment.

The angle feedback process M50 includes a disturbance observer M52, which estimates a disturbance torque Tld. The disturbance torque Tld is torque excluded from the torque that affects the pinion angle θp other than an angle-side operation amount Tt*, which is obtained by correcting the angle-side operation amount Tt0* through a process that will be described later. The disturbance torque Tld includes the steering torque Th and the steering-side operation amount Ts*.

In the present embodiment, the disturbance torque Tld is converted into the torque added to the steering shaft 24. The disturbance observer M52 estimates the disturbance torque Tld with the following expression (c2) using the angle-side operation amount Tt* converted into the torque of the steering shaft 24.

$$J \cdot \theta p^{*\prime\prime} = Tt^* + Tld \quad (c2)$$

More specifically, in the present embodiment, the disturbance observer M52 calculates the disturbance torque Tld and an estimated value θpe with the following expression (c3) using a matrix L with three rows and one column, which specifies the estimated value θpe of the pinion angle θp, the angle-side operation amount Tt*, and observer gains l1, l2, and l3.

$$\dot{X}e = AXe + BTt* - L(\theta pe - \theta p) \quad (c3)$$

$$Xe = \begin{pmatrix} \theta pe \\ \dot{\theta} pe \\ Tld \end{pmatrix} \quad A = \begin{pmatrix} 0 & 1 & 0 \\ 0 & 0 & \frac{1}{J} \\ 0 & 0 & 0 \end{pmatrix} \quad B = \begin{pmatrix} 0 \\ \frac{1}{J} \\ 0 \end{pmatrix} \quad L = \begin{pmatrix} l1 \\ l2 \\ l3 \end{pmatrix}$$

A differentiation calculation process M54 is a process for calculating a pinion angular velocity command value by differentiating the pinion angle command value θp*.

A feedback term calculation process M56 is a process for calculating a feedback operation amount Ttfb, which is the sum of the output value of a proportional element having the difference between the pinion angle command value θp* and the estimated value θpe as an input and the output value of a differential element having the differential value of the difference as an input.

A second order differential process M58 is a process for calculating a second order time differential value of the pinion angle command value θp*. A feedforward term calculation process M60 is a process for calculating a feedforward operation amount Ttff by multiplying an output value of the second order differential process M58 by the inertia coefficient J. A two-degree-of-freedom operation amount calculation process M62 is a process for calculating the angle-side operation amount Tt0* by subtracting the disturbance torque Tld from the sum of the feedback operation amount Ttfb and the feedforward operation amount Ttff.

A fail-safe process M70 is a process for calculating the decrease correction amount ΔTt* when the controllability of the electric motor 32 based on the angle feedback process M50 (i.e., based on the angle-side operation amount Tt0*) is less than or equal to a predetermined efficiency. The decrease correction amount ΔTt* is a value used to correct the angle-side operation amount Tt0* such that the angle-side operation amount Tt0* decreases.

A subtraction process M72 is a process for calculating the angle-side operation amount Tt* by subtracting the decrease correction amount ΔTt* from the angle-side operation amount Tt0*.

An addition process M74 is a process for calculating the required torque Td for the electric motor 32 by adding the steering-side operation amount Ts* and the angle-side operation amount Tt*.

A conversion process M76 is a process for converting the required torque Td into a torque command value Tm*, which is a command value of the torque for the electric motor 32, by dividing the required torque Td by the deceleration ratio Km.

An operation signal generation process M78 is a process for generating and outputting an operation signal MS of the inverter 33, which is used to adjust the torque output by the electric motor 32 to the torque command value Tm*. The operation signal MS is actually an operation signal for each leg of the inverter 33.

Figure 3:
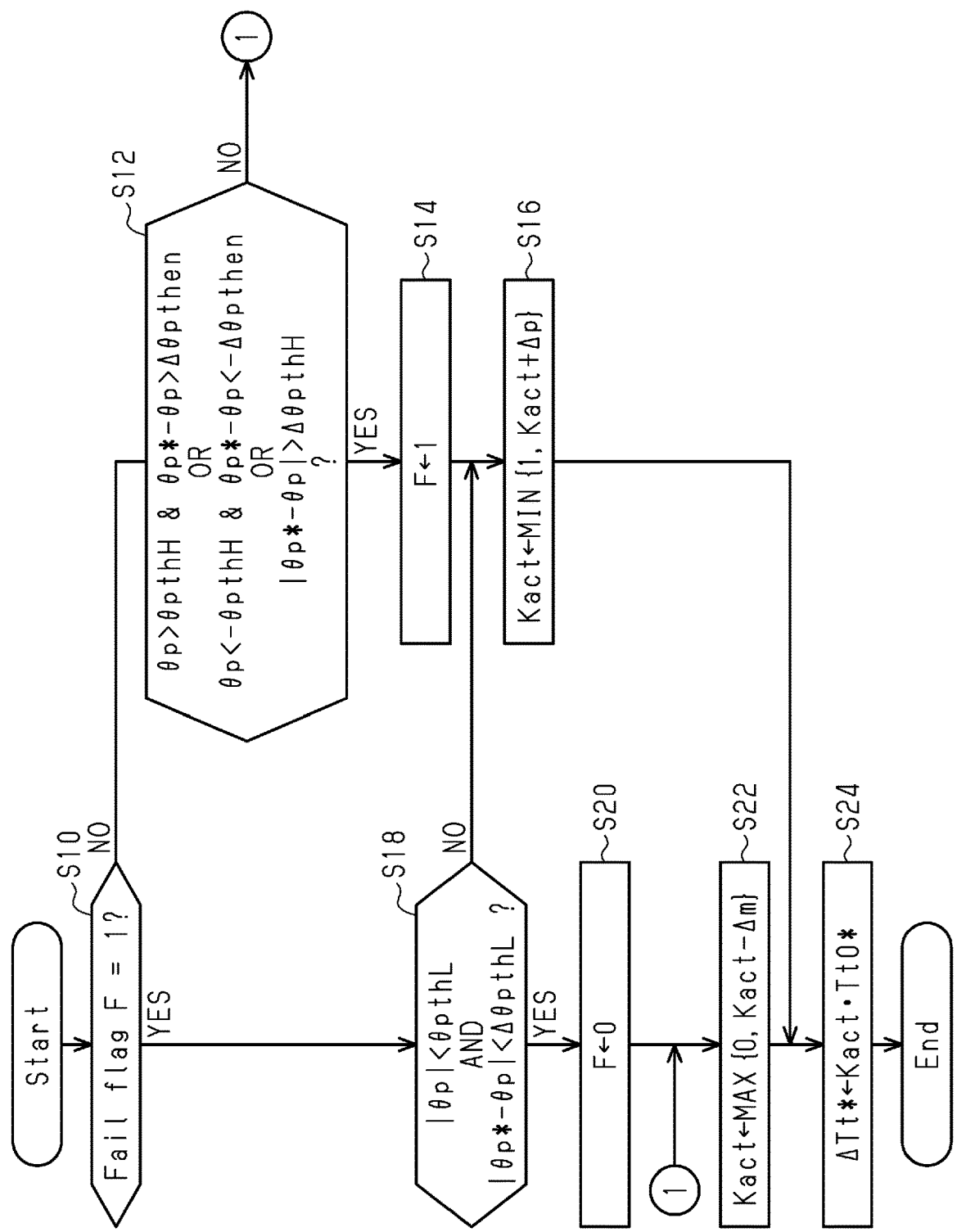
FIG. 3 is a flowchart illustrating the procedure of a fail-safe process of the embodiment.

FIG. 3 illustrates the procedure for the fail-safe process M70. The process shown in FIG. 3 is executed by the CPU 42 repeatedly executing programs stored in the ROM 44, for example, at a predetermined interval. In the following description, the number of each step is represented by the letter S followed by a numeral.

In a series of processes shown in FIG. 3, the CPU 42 first determines whether a fail flag F is 1 (S10). When the fail flag F is 1, the fail flag F indicates that the controllability of the electric motor 32 based on the angle feedback process M50 is less than or equal to the predetermined efficiency. When the fail flag F is 0, the fail flag F indicates that the controllability of the electric motor 32 based on the angle feedback process M50 is not less than or equal to the predetermined efficiency. When determining that the fail flag F is 0 (S10: NO), the CPU 42 determines whether the logical disjunction of the following conditions (i) to (iii) is true (S12).

Condition (i): The logical conjunction of a condition in which the pinion angle θp is larger than a predetermined value θpthH and a condition in which the value obtained by subtracting the pinion angle θp from the pinion angle command value θp* is larger than a predetermined value Δθpthen is true.

The predetermined value θpthH is set to a pinion angle θp when the movement amount of the rack shaft 26 in the axial direction reaches the upper limit value of the movement amount of the rack shaft 26 in the axial direction determined by the rack housing 29. The satisfaction of the condition indicates that the rack housing 29 prevents further movement of the rack shaft 26 in axial direction and the absolute value of the pinion angle θp cannot be further increased.

Condition (ii): The logical conjunction of a condition in which the pinion angle θp is less than a value obtained by multiplying the predetermined value θpthH by negative one and a condition in which the value obtained by subtracting the pinion angle θp from the pinion angle command value θp* is greater than a value obtained by multiplying the predetermined value Δθpthen by negative one is true.

The satisfaction of the condition indicates that the rack housing 29 prevents further movement of the rack shaft 26 in axial direction and the absolute value of the pinion angle θp cannot be further increased.

Condition (iii): The absolute value of the difference between the pinion angle command value θp* and the pinion angle θp is greater than or equal to the predetermined value ΔθpthH.

The predetermined value ΔθpthH is set to a value larger than the maximum value that hypothetically occurs as the absolute value of the difference between the pinion angle command value θp* and the pinion angle θp when an angle control by the angle feedback process M50 is normally executed.

When determining that the logical disjunction is true (S12: YES), the CPU 42 determines that the controllability of the electric motor 32 based on the angle feedback process M50 is less than or equal to the predetermined efficiency and substitutes 1 into the fail flag F (S14). Then, the CPU 42 substitutes, into a gain Kact, the smaller one of 1 and a value obtained by adding a smaller predetermined amount Δp than 1 to the gain Kact (S16). This process is a process for gradually increasing the gain Kact from 0 to 1. The initial value of the gain Kact is 0.

When determining that the fail flag F is 1 (S10: YES), the CPU 42 determines whether the logical conjunction of the following conditions (iv) and (v) is true (S18).

Condition (iv): The absolute value of the pinion angle θp is less than or equal to a predetermined value θpthL. The predetermined value θpthL is smaller than the predetermined value θpthH.

Condition (v): The absolute value of the difference between the pinion angle command value θp* and the pinion angle θp is less than or equal to a predetermined value ΔθpthL.

The predetermined value ΔθpthL is smaller than the predetermined value ΔθpthH. The predetermined value ΔθpthL is set to a value that hypothetically occurs as the absolute value of the difference between the pinion angle command value θp* and the pinion angle θp when the angle control by the angle feedback process M50 is normally executed.

When determining that the logical conjunction is false (S18: NO), the CPU 42 proceeds to the process of S16. When determining that the logical conjunction is true (S18: YES), the CPU 42 determines that the controllability of the electric motor 32 based on the angle feedback process M50 returns from the situation in which the controllability is less than or equal to the predetermined efficiency and substitutes 0 into the fail flag F (S20). When completing the process of S20 or making a negative determination in the process of S12, the CPU 42 substitutes, into the gain Kact, the smaller one of 0 and a value obtained by decreasing the gain Kact by a smaller predetermined amount Δm than 1 (S22). This process is a process for gradually decreasing the gain Kact from 1 to 0.

When completing the process of S16 or S22, the CPU 42 substitutes, into the decrease correction amount ΔTt*, a value obtained by multiplying the gain Kact by the angle-side operation amount Tt0* (S24).

When completing the process of step S24, the CPU 42 temporarily ends the series of processes shown in FIG. 3.

The operation and advantages of the present embodiment will now be described.

The CPU 42 calculates the pinion angle command value θp* in accordance with the axial force Taf0, which is the sum of the steering torque Th and the steering-side operation amount Ts*, which is an operation amount used for the feedback control that adjusts the steering torque Th to the target torque Th*. Subsequently, the CPU 42 executes the angle feedback process M50 for calculating the angle-side operation amount Tt0*, which is an operation amount used for the feedback control that adjusts the pinion angle θp to the pinion angle command value θp*. The CPU 42 operates the electric motor 32 in accordance with the sum of the steering-side operation amount Ts* and the angle-side operation amount Tt*, which is obtained by subtracting the decrease correction amount ΔTt* from the angle-side operation amount Tt0*.

The angle-side operation amount Tt0* is calculated by subtracting the disturbance torque Tld, which includes the steering torque Th and the steering-side operation amount Ts*, from the sum of the feedback operation amount Ttfb and the feedforward operation amount Ttff. Thus, the angle-side operation amount Tt0* is a suitable value for adjusting the pinion angle θp to the pinion angle command value θp* in cooperation with the steering-side operation amount Ts*.

When determining that the controllability of the electric motor 32 based on the angle feedback process M50 is less than or equal to the predetermined efficiency, the CPU 42 sets the gain Kact to 1 so that the decrease correction amount ΔTt* becomes equal to the angle-side operation amount Tt0*. Since the angle-side operation amount Tt* used as an input of the addition process M74 becomes zero, when the controllability of the electric motor 32 based on the angle feedback process M50 is less than or equal to the predetermined efficiency, the torque control of the electric motor 32 using the angle feedback process M50 is invalidated. As a result, the torque of the electric motor 32 is adjusted only in accordance with the steering-side operation amount Ts*, which is an operation amount used for the feedback control that adjusts the steering torque Th to the target torque Th*.

Further, the CPU 42 gradually decreases the angle-side operation amount Tt* by gradually increasing the gain Kact. This prevents the torque of the electric motor 32 from changing abruptly.

Additionally, the CPU 42 calculates the axial force Taf by subtracting, from the axial force Taf0, the decrease correction amount ΔTt*, which is a deficient amount of the angle-side operation amount Tt* for the angle-side operation amount Tt0*, and sets the axial force Taf as an input of the angle command value calculation process M30.

The angle-side operation amount Tt0*, calculated through the angle feedback process M50, is a suitable value for adjusting the pinion angle θp to the pinion angle command value θp*. Thus, when the absolute value of the difference between the angle-side operation amount $Tt0^*$ and the angle-side operation amount $Tt^*$, which is used as an input of the addition process M74 is larger than zero, the pinion angle $\theta p$ may greatly deviate from the pinion angle command value $\theta p^*$. In this case, the angle-side operation amount $Tt0^*$ calculated through the angle feedback process M50 becomes a large value. Thus, when determining that the controllability of the electric motor 32 based on the angle feedback process M50 returns from the situation in which the controllability is less than or equal to the predetermined efficiency and setting the decrease correction amount $\Delta Tt^*$ to 0 by setting the gain Kact to 0, the angle-side operation amount $Tt^*$ may become large and the torque of the electric motor 32 may be excessively large.

In the present embodiment, when the absolute value of the angle-side operation amount $Tt^*$ is decreased relative to the absolute value of the angle-side operation amount $Tt0^*$, the axial force Taf, which is used as an input of the angle command value calculation process M30, is decreased by the decrease correction amount $\Delta Tt^*$. The angle command value calculation process M30 calculates the pinion angle command value $\theta p^*$ to a value approximate to the pinion angle $\theta p$. This prevents the absolute value of the angle-side operation amount $Tt0^*$ from becoming excessively large.

Correspondence

The correspondence between the items in the above embodiments and the items described in the above-described SUMMARY is as follows. In the following description, the correspondence is shown for each of the numbers in the examples described in the SUMMARY.

In Examples 1 to 3 and 6, the "torque control process" corresponds to the base target torque calculation process M10, the addition process M12, the hysteresis process M14, and the torque feedback process M16. The "convertible angle" corresponds to the pinion angle $\theta p$. The "operation process" corresponds to the addition process M74, the conversion process M76, and the operation signal generation process M78. The "determination process" corresponds to the process of S12. The "switch process" corresponds to the processes of S16 and S24 and the subtraction process M72. The "drive circuit" corresponds to the inverter 33.

In Example 4, the "gradual decreasing process" corresponds to increasing the gain Kact by the smaller predetermined amount $\Delta p$ than 1 in the process of S16. This gradually increases the decrease correction amount $\Delta Tt^*$ such that the decrease correction amount $\Delta Tt^*$ becomes equal to the angle-side operation amount $Tt0^*$, thereby gradually decreasing the angle-side operation amount $Tt^*$.

In Example 5, the "subtraction process" corresponds to the subtraction process M20.

In Example 7, the "target torque calculation process" corresponds to the base target torque calculation process M10, the hysteresis process M14, and the addition process M12.

Modifications

At least one of the features of the above-described embodiment may be modified as follows.

Determination Process

In the above-described embodiment, in a case in which the fail flag F is set to 1 when any one of the conditions (i) to (iii) is satisfied, the fail flag F is set to 0 when the logical conjunction of condition (iv) and condition (v) is true. Instead, for example, in a case in which the fail flag F is set to 1 when condition (i) or (ii) is satisfied, the fail flag F may be set to 0 when condition (iv) is satisfied. Alternatively, in a case in which the fail flag F is set to 1 when condition (iii) is satisfied, the fail flag F may be set to 0 when condition (v) is satisfied.

Alternatively, in a case in which, for example, the fail flag F is set to 1 when condition (i) or (ii) is satisfied, the fail flag F may be set to 0 when the logical conjunction of condition (iv) and a predetermined condition (described as follows) is true. The predetermined condition is at least one of three conditions, namely, a condition in which the absolute value of the steering torque Th is less than or equal to a predetermined value, a condition in which the absolute value of the difference between the pinion angle $\theta p$ and the pinion angle command value $\theta p^*$ is less than or equal to the predetermined value, and a condition in which the absolute value of the difference between the differential value of the pinion angle $\theta p$ and the differential value of the pinion angle command value $\theta p^*$ is less than or equal to the predetermined value.

As another option, for example, in a case in which the fail flag F is set to 1 when condition (iii) is satisfied, if the logical conjunction of condition (v) and the condition in which the absolute value of the difference between the differential value of the pinion angle $\theta p$ and the differential value of the pinion angle command value $\theta p^*$ is less than or equal to the predetermined value is true, the fail flag F may be set to 0.

Subtraction Process

In the above-described embodiment, the decrease correction amount $\Delta Tt^*$ is subtracted from the axial force Taf0 in the subtraction process M20. Instead, as described in the sections of Steering-Side Operation Amount and Angle-Side Operation Amount, all of the steering-side operation amount $Ts^*$, the axial force Taf0, and the angle-side operation amount $Tt0^*$ do not need to be converted into the torque applied to the steering shaft 24. For this reason, the axial force Taf0 and the angle-side operation amount $Tt0^*$ do not have to be converted into the torque applied to the same object. In this case, the value obtained by converting the decrease correction amount $\Delta Tt^*$ into the torque applied to the same object as the axial force Taf0 is subtracted from the axial force Taf0.

When the gain Kact is larger than 0, the value obtained by subtracting the decrease correction amount $\Delta Tt^*$ from the axial force Taf0 in the subtraction process M20 does not need to be used as an input of the angle command value calculation process M30. For example, at the point in time at which the gain Kact becomes 1, the output value of an integral element that holds the output of the angle command value calculation process M30 may be fixed to the pinion angle $\theta p$, and the values of other integral elements may be reset. Even in this case, when the gain Kact increases to be larger than zero, the pinion angle command value $\theta p^*$ output by the angle command value calculation process M30 does not greatly deviate from the pinion angle $\theta p$. This prevents the angle-side operation amount $Tt0^*$ from becoming excessively large.

Gradual Decreasing Process

The process for gradually decreasing the angle-side operation amount $Tt^*$ is not limited to the process of S16. For example, the process may be to consecutively substitute, into the gain Kact, the output value of a first order delay process or a second order delay process for a step response of setting the magnitude of the input value to 1.

Further, the gradual decreasing process does not have to be executed. Instead, for example, the angle-side operation amount $Tt^*$ may be decreased in a stepwise manner to 0.

Switch Process

In the above-described embodiment, when the controllability of the angle feedback control is not less than or equal to the predetermined efficiency, the torque command value Tm* is determined by the sum of the steering-side operation amount Ts* and the angle-side operation amount Tt* (i.e., at least the angle-side operation amount Tt*). Instead, for example, when the controllability of the angle feedback control is not less than or equal to the predetermined efficiency, the torque command value Tm* may be determined only by the angle-side operation amount Tt* regardless of the steering-side operation amount Ts*. In such a configuration, when the controllability of the angle feedback control is less than or equal to the predetermined efficiency, the torque command value Tm* is determined based on the steering-side operation amount Ts*.

Angle Command Value Calculation Process

In the above-described embodiment, the pinion angle command value θp* is calculated using the axial force Taf as an input of the angle command value calculation process M30. Instead, for example, the steering-side operation amount Ts* may be used as an input of the angle command value calculation process M30. In the above-described embodiment, the pinion angle command value θp* is calculated based on the above-described expression (c1) using the axial force Taf as an input of the angle command value calculation process M30. However, the logic (model) for calculating the pinion angle command value θp* is not limited to this calculation.

Disturbance Observer

For example, in the two-degree-of-freedom operation amount calculation process M62 of the above-described embodiment, not only the disturbance torque Tld but also the steering-side operation amount Ts* may be subtracted from the sum of the feedback operation amount Tab and the feedforward operation amount Ttff, and the value used as an input of the disturbance observer M52 may be changed from the angle-side operation amount Tt* to Tt*+Ts*. In this case, the disturbance torque Tld is torque excluded from the torque that affects the pinion angle θp other than the torque of the electric motor 32.

Alternatively, for example, in the two-degree-of-freedom operation amount calculation process M62 of the above-described embodiment, not only the disturbance torque Tld but also the steering-side operation amount Ts* and the steering torque Th may be subtracted from the sum of the feedback operation amount Ttfb and the feedforward operation amount Ttff, and the value used as an input of the disturbance observer M52 may be changed from the angle-side operation amount Tt* to Tt*+Ts*+Th. In this case, the disturbance torque Tld is torque excluded from the torque that affects the pinion angle θp other than the sum of the torque of the electric motor 32 and the steering torque Th.

The disturbance torque Tld does not have to be calculated in the manner illustrated in the above-described embodiment. For example, the disturbance torque Tld may be calculated by subtracting the angle-side operation amount Tt*, the steering-side operation amount Ts*, and the steering torque Th from a value obtained by multiplying the inertia coefficient J by the second order time differential value of the pinion angle command value θp*. Alternatively, the disturbance torque Tld may be calculated by subtracting the angle-side operation amount Tt*, the steering-side operation amount Ts*, and the steering torque Th from a value obtained by multiplying the inertia coefficient J by the second order time differential value of the pinion angle θp. As another option, the disturbance torque Tld may be calculated by subtracting the angle-side operation amount Tt*, the steering-side operation amount Ts*, and the steering torque Th from a value obtained by multiplying the inertia coefficient J by the second order time differential value of the estimated value θpe.

Angle Feedback Process

In the above-described embodiment, the feedforward operation amount Ttff is calculated based on a second order time differential value of the pinion angle command value θp*. Instead, the feedforward operation amount Ttff may be calculated based on, for example, the second order time differential value of the pinion angle θp. Alternatively, the feedforward operation amount Ttff may be calculated based on, for example, the second order time differential value of the difference between the pinion angle command value θp* and the pinion angle θp.

The feedback control amount input to the feedback term calculation process M56 is not limited to the estimated value θpe or the first order time differential value of the estimated value θpe. Instead, the feedback control amount may be the pinion angle θp or the time differential value of the pinion angle θp.

The feedback term calculation process M56 is not limited to the process for outputting the sum of the output value of the proportional element and the output value of the differential element. Instead, for example, the feedback term calculation process M56 may be a process for outputting the output value of the proportional element or may be a process for outputting the output value of the differential element. Alternatively, the feedback term calculation process M56 may be a process for outputting the sum of the output value of the integral element and at least one of the output value of the proportional element and the output value of the differential element.

Convertible Angle

In the above-described embodiment, the pinion angle θp is used as the convertible angle. Instead, for example, the steerable angle of the steerable wheel may be used as the convertible angle.

Steering-Side Operation Amount

In the above-described embodiment, the steering-side operation amount Ts* is converted into the torque of the steering shaft 24. Instead, for example, the steering-side operation amount Ts* may be converted into the torque of the electric motor 32.

Angle-Side Operation Amount

In the above-described embodiment, the angle-side operation amount Tt* is converted into the torque of the steering shaft 24. Instead, for example, the angle-side operation amount Tt* may be converted into the torque of the electric motor 32.

Target Torque Calculation Process

The base torque calculation process M10 is not limited to a process for calculating the base target torque Thb* in accordance with the axial force Taf and the vehicle speed V. Instead, for example, the base target torque calculation process M10 may be a process for calculating the base target torque Thb* only based on the axial force Taf0.

The base target torque Thb* does not have to be corrected with the hysteresis correction amount Thys.

Base Target Torque

The base target torque Thb* does not have to be obtained based on the axial force Taf0. Instead, for example, an assist torque that assists steering may be calculated based on the steering torque Th, and the base target torque Thb* may be calculated based on the sum of the assist torque and the steering torque.

Torque Control Process

The torque control process does not have to calculate the steering-side operation amount Ts* as an operation amount used for the feedback control that adjusts the steering torque Th to the target torque Th*. The torque control process may be only a process for, for example, calculating, as the steering-side operation amount Ts*, an assist torque that assists steering based on the steering torque Th. Even in this case, since the steering-side operation amount Ts* is used to change the steering torque Th as necessary for steering as intended by the user, the steering-side operation amount Ts* is an operation amount for adjusting the steering torque Th. Even in this case, the sum of the steering torque Th and the steering-side operation amount Ts* simply needs to be set as the axial force Taf0, and the axial force Tarn simply needs to be used to calculate the pinion angle command value θp*.

Steering Controller

The steering controller is not limited to a device that includes the CPU 42 and the ROM 44 and executes software processing. For example, a dedicated hardware circuit (such as an ASIC) may be provided that executes at least part of the software processes executed in the above-described embodiment. That is, the steering controller may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above-described processes may be executed in any manner as long as the processes are executed by processing circuitry that includes at least one of a set of one or more software processing circuits and a set of one or more dedicated hardware circuits.

Electric Motor, Drive Circuit

The electric motor is not limited to a SPMSM and may be an interior permanent magnet synchronous motor (IPMSM). Alternatively, the electric motor is not limited to a synchronous motor and may be an induction motor. As another option, the electric motor may be, for example, a brushed direct-current electric motor. In this case, an H bridge circuit simply needs to be employed for the drive circuit.

Steering Actuator

The steering actuator 30 does not have to be the actuator illustrated in the above-described embodiment. The steering actuator 30 may be of, for example, a dual pinion type including a second pinion shaft that transmits the power of the electric motor 32 to the rack shaft 26 in addition to the pinion shaft 24c. Further, in the steering actuator 30, the output shaft 32a of the electric motor 32 may be mechanically coupled to the steering shaft 24. In this case, the steering actuator and the steering mechanism 20 share the steering shaft 24 and the rack-and-pinion mechanism 27.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A steering controller for operating a steering actuator that incorporates an electric motor and steers a steerable wheel, wherein the steering controller comprises processing circuitry configured to execute:
  a torque control process that calculates a steering-side operation amount based on a steering torque input by a driver, the steering-side operation amount being used to adjust the steering torque and being convertible into torque required for the electric motor;
  an angle command value calculation process that calculates an angle command value based on the steering-side operation amount, the angle command value being a command value of a convertible angle that is convertible into a steerable angle of the steerable wheel;
  an angle feedback control process that calculates an angle-side operation amount, the angle-side operation amount being used for feedback control that adjusts the convertible angle to the angle command value and being convertible into the torque required for the electric motor;
  a process that obtains a torque command value based on at least one of the steering-side operation amount or the angle-side operation amount;
  an operation process that operates a drive circuit of the electric motor to adjust the torque of the electric motor to the torque command value;
  a determination process that determines whether a controllability of the electric motor based on the angle feedback process is less than or equal to a predetermined efficiency; and
  a switch process that switches, when determining that the controllability is less than or equal to the predetermined efficiency, the torque command value from a value based on the angle-side operation amount to a value based on the steering-side operation amount instead of the angle-side operation amount.

2. The steering controller according to claim 1, wherein the steering actuator includes
  a rack shaft configured to move in an axial direction to steer the steerable wheel, and
  a rack housing configured to limit a potential value of the steerable angle, and
  the determination process includes determining that the controllability is less than or equal to the predetermined efficiency when determining that further movement of the rack shaft in the axial direction is restricted by the rack housing based on the steerable angle.

3. The steering controller according to claim 1, wherein the determination process includes determining that the controllability is less than or equal to the predetermined efficiency when an absolute value of a difference between the convertible angle and the angle command value is larger than a predetermined value.

4. The steering controller according to claim 1, wherein the switch process includes a gradual decreasing process that gradually decreases, to zero, an absolute value of the angle-side operation amount used as an input of the operation process as the torque command value changes from the value based on the angle-side operation amount to the value based on the steering-side operation amount instead of the angle-side operation amount.

5. The steering controller according to claim 1, wherein the switch process includes a subtraction process that subtracts, from an amount based on the steering-side operation amount, an amount corresponding to a deficient amount of the angle-side operation amount used as an input of the operation process for the angle-side operation amount calculated through the angle feedback control process as the torque command value changes from the value based on the angle-side operation amount to the value based on the steering-side operation amount instead of the angle-side operation amount.

6. The steering controller according to claim 1, wherein the torque control process includes a torque feedback process that calculates the steering-side operation amount used for feedback control that adjusts the steering torque input by the driver to the target torque.

7. The steering controller according to claim 6, wherein
the processing circuitry is configured to execute a target torque calculation process that calculates the target torque, and
the target torque calculation process includes
obtaining a conversion amount by converting each of the steering-side operation amount and the steering torque into force acting on a same object, and
calculating the target torque based on a sum of the conversion amounts.

8. A steering control method for operating a steering actuator that incorporates an electric motor and steers a steerable wheel, the steering control method comprising:

calculating a steering-side operation amount based on a steering torque input by a driver, the steering-side operation amount being used to adjust the steering torque and being convertible into torque required for the electric motor;

calculating an angle command value based on the steering-side operation amount, the angle command value being a command value of a convertible angle that is convertible into a steerable angle of the steerable wheel;

executing an angle feedback control process that calculates an angle-side operation amount, the angle-side operation amount being used for feedback control that adjusts the convertible angle to the angle command value and being convertible into the torque required for the electric motor;

obtaining a torque command value based on at least one of the steering-side operation amount or the angle-side operation amount;

operating a drive circuit of the electric motor to adjust the torque of the electric motor to the torque command value;

determining whether a controllability of the electric motor based on the angle feedback process is less than or equal to a predetermined efficiency; and switching, when determining that the controllability is less than or equal to the predetermined efficiency, the torque command value from a value based on the angle-side operation amount to a value based on the steering-side operation amount instead of the angle-side operation amount.

* * * * *